Patented Sept. 11, 1934

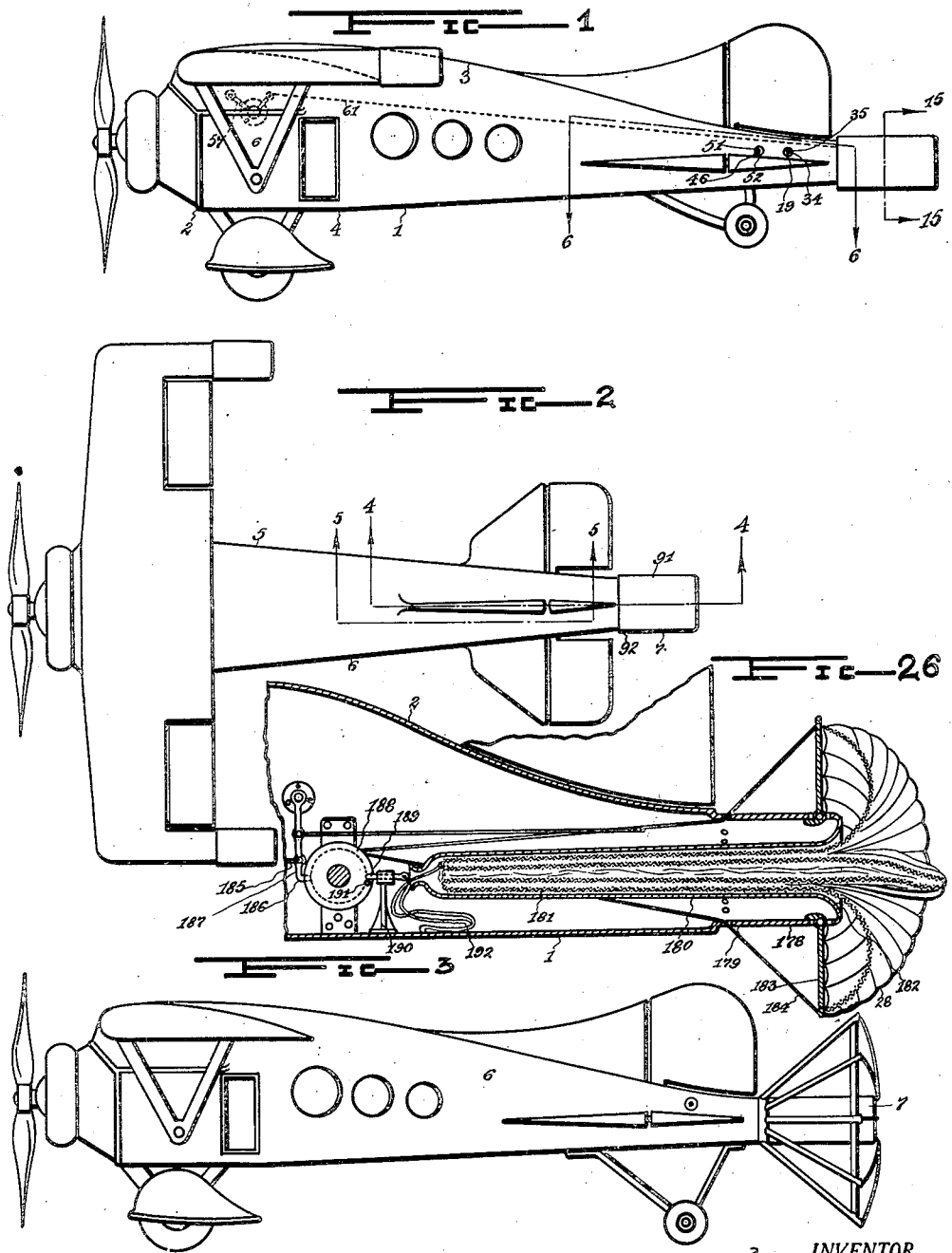

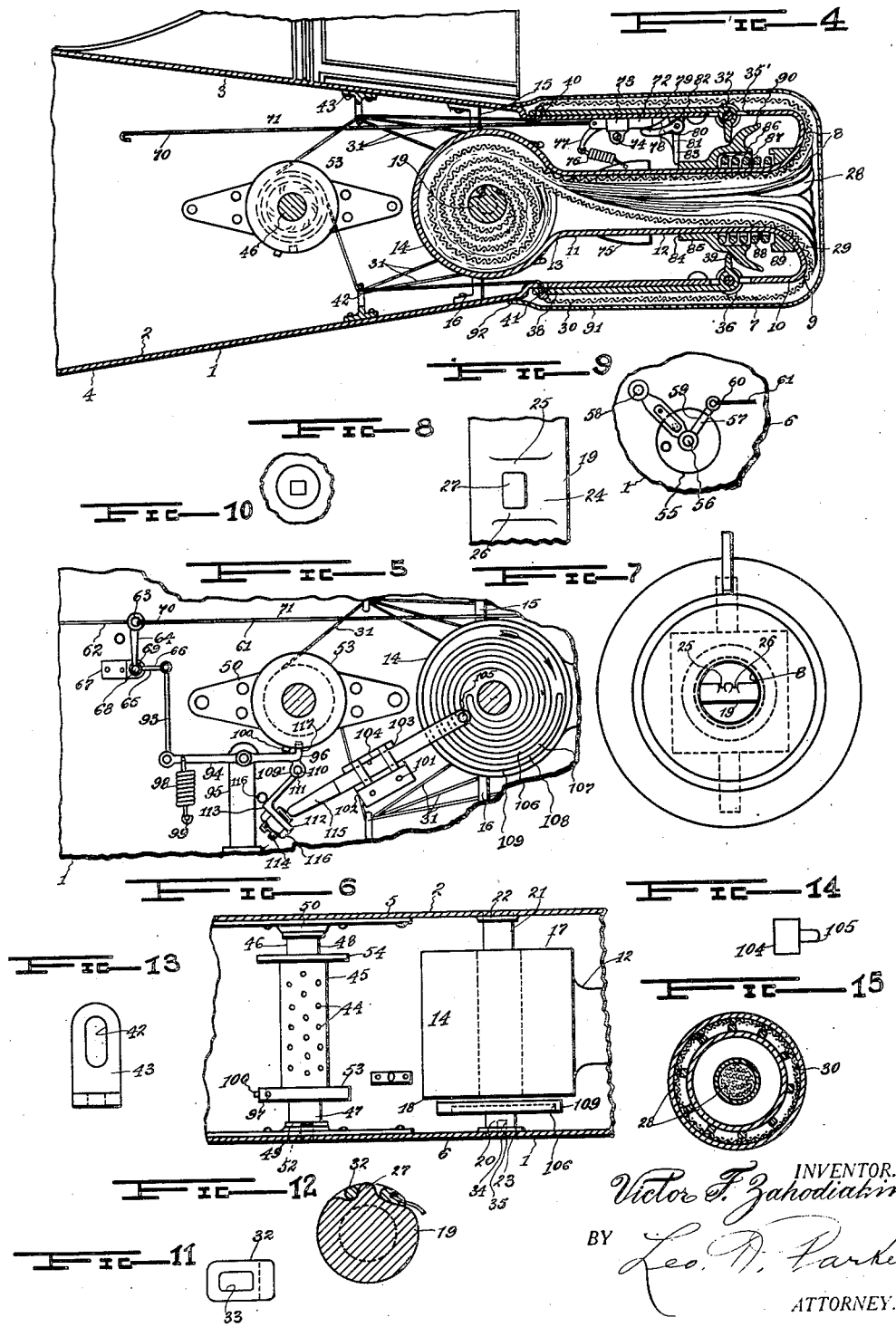

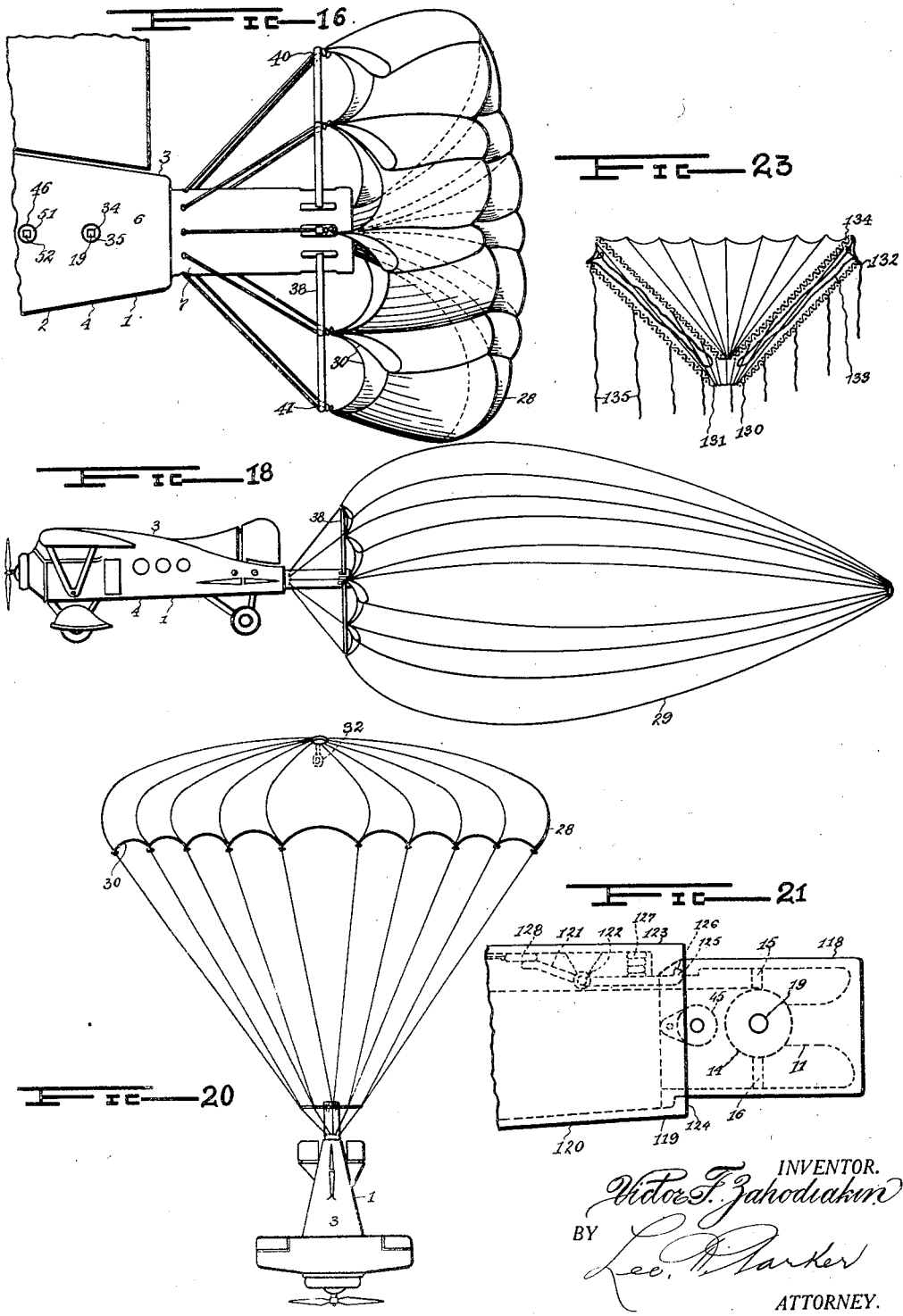

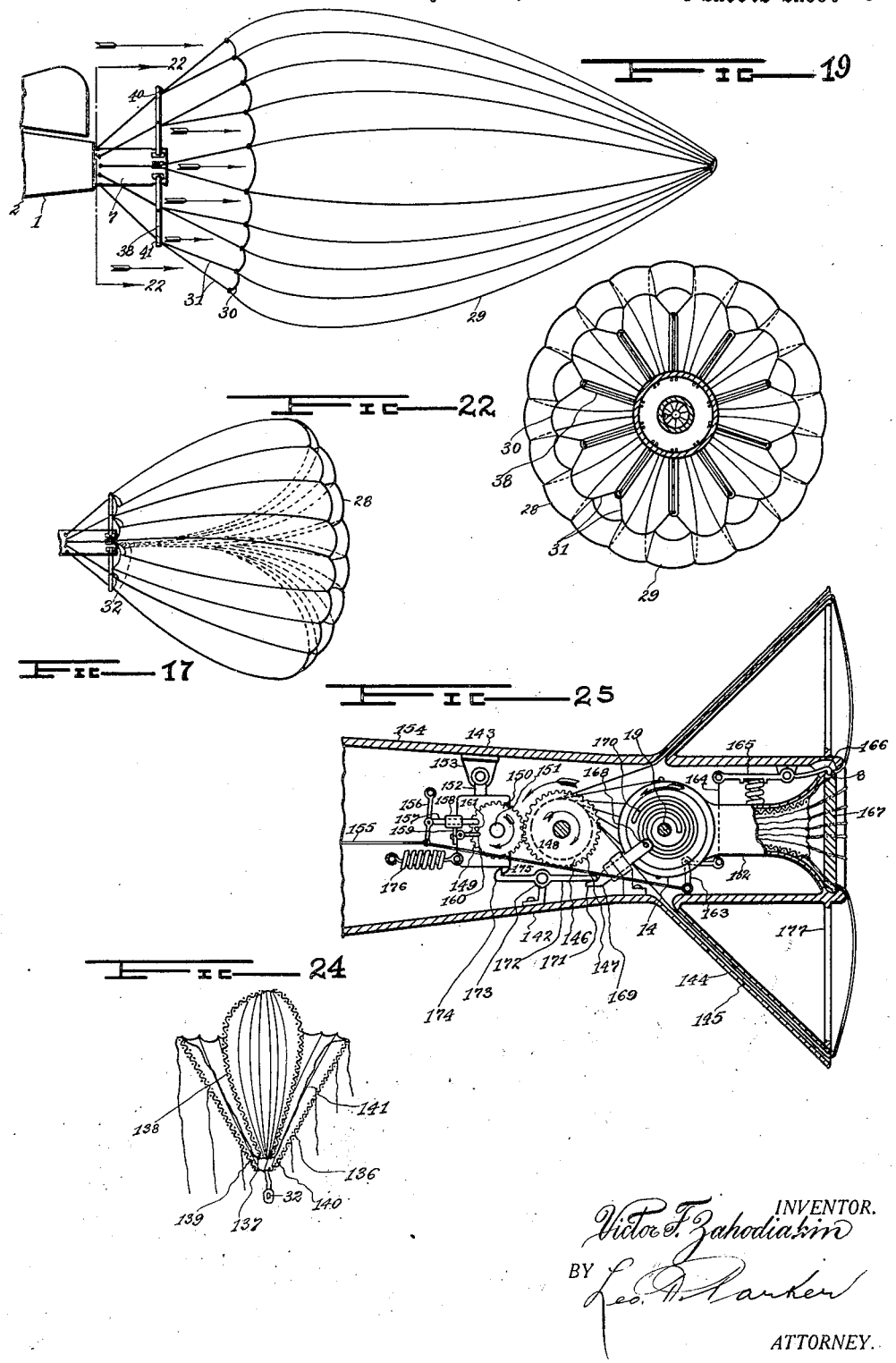

1,972,967

UNITED STATES PATENT OFFICE 1,972,967

AIRPLANE SAFETY DEVICE

Victor F. Zahodiakin, Cincinnati, Ohio

Application April 14, 1932, Serial No. 605,298

14 Claims. (Cl. 244—21)

The invention relates to airplane safety devices.

Heretofore, passengers and pilots traveling in airplanes have been subject to considerable danger because when an airplane begins to fall, collides with an object, or when the engine stalls, or the propeller, wings, controls, or any other mechanical parts of the airplane become broken, the operator has no control over the airplane because he has no means which can be utilized to land the airplane with safety to the passengers and himself.

Therefore, an important object of the invention is to provide a simple, efficient, durable and practical means whereby an airplane may descend to the ground at a slow rate of speed.

Other objects of the invention are to provide simple, efficient and convenient manually operative means whereby the pilot of an airplane may instantly cause a parachute to be discharged concentrically from the tail of the airplane by air pressure produced by movement of the airplane; to provide means whereby said parachute is caused to be discharged from said tail irrespective of the weather conditions, or the altitude of the airplane; to provide means whereby said parachute is discharged from said tail gradually and within a short period of time, whereby the speed at which the airplane is traveling is instantly reduced to a very slow rate of speed; and to provide means whereby when the airplane contacts the ground the parachute may be disconnected from said airplane thereby reducing the likelihood of injuring the occupants thereof or damaging the airplane as a result of said airplane being dragged by said parachute.

The invention consists in the combination of the elements, arrangement of the parts and in the details of the construction, as hereinafter claimed.

In the drawings:

Fig. 1 is a side elevational view of an airplane having the invention incorporated therewith;

Fig. 2 is a top view of the same;

Fig. 3 is a side elevational view of an airplane having a modified form of the invention incorporated therewith;

Fig. 4 is a section taken on a line corresponding to 4—4 in Fig. 2;

Fig. 5 is a section taken on a line corresponding to 5—5 in Fig. 2;

Fig. 6 is a section taken on a line corresponding to 6—6 in Fig. 1, with parts removed;

Fig. 7 is an end elevational view of the invention with the cover and parachute removed;

Fig. 8 is a plan elevational view of the parachute shaft, with parts broken away;

Fig. 9 is an inside elevational view of the manual operative control;

Fig. 10 is a side view of a portion of the airplane illustrating an end view of the winding shaft;

Fig. 11 is a plan view of the parachute holding ring;

Fig. 12 is an enlarged section of parachute shaft with holding ring as shown in Fig. 4;

Fig. 13 is a rear elevational view of a cable support;

Fig. 14 is an end elevational view of the time arm;

Fig. 15 is a section taken on a line corresponding to 15—15 in Fig. 1;

Fig. 16 is a side elevational view of an airplane, with parts broken away, and showing the parachute in partly open position;

Fig. 17 is a side elevational view of an airplane, with parts broken away, showing the parachute in more fully opened position;

Fig. 18 is a side elevational view of an airplane showing the parachute completely open with cables partly released.

Fig. 19 is a side elevational view of an airplane, with parts broken away, showing the parachute fully open with the cables in farther released position;

Fig. 20 is a side elevational view showing the parachute in fully open position and the cables fully released with the airplane in descending position;

Fig. 21 is a side elevational view of an airplane, with parts broken away, showing parachute releasing mechanism;

Fig. 22 is a section taken on a line corresponding to 22—22 in Fig. 19;

Fig. 23 is a vertical section of a compound parachute;

Fig. 24 is a vertical section showing a modified form of a compound parachute;

Fig. 25 is a vertical section of an airplane, with parts broken away, showing a modified form of the invention; and Fig. 26 is a vertical section of an airplane, with parts broken away and parts removed, showing a modified form of the invention.

The preferred construction of the invention is exemplified and incorporated with the usual airplane 1 having the body 2 comprising the top 3, bottom 4, and sides 5 and 6. In the cylindrical tail 7 of the airplane 1 is the compartment 8. The rear edge 9 of the walls 10 of the tail is curved inwardly and has integrally formed therewith the centrally disposed receptacle 11 comprising the tube 12, which extends forwardly of the airplane, and has integrally formed with its front end 13 the cylinder 14 fixed to the top and bottom 3 and 4, of the airplane, as by the supports 15 and 16. Received through the ends 17 and 18 of the cylinder 14 is the parachute shaft 19 having its outer ends 20 and 21 rotatably mounted in the bearings 22 and 23 suitably fixed to the inner surface of the sides 5 and 6 of the airplane. In the side 24 of the shaft 19 are the grooves 25 and 26, whereby the tongue 27 is formed.

The receptacle 11 is hollow and adapted to receive the parachute 28 which comprises the cloth body or top 29 having secured to its lower edge 30 the equal distant spaced apart cables 31. Centrally disposed in the top of the body 29 is the holding ring or link 32 being suitably secured to the body as by stitching. In the link 32 is the hole 33 adapted to receive the tongue 27 on the shaft 19. The outer end 20 of the shaft 19 has the square hole 34 therein adapted to receive a suitable wrench, inserted through the hole 35 in the side 6 of the airplane. In ordinary practice, when it is desired to wind the parachute around the shaft 19, the link 32 is attached to the shaft as by the tongue 27 being received through the hole 33 in the link. Then by use of a suitable manually operative handle or socket wrench, which fits into the hole 34 in the shaft 19, the shaft is manually rotated and the body 29 of the parachute 28 is wound around the shaft, in the position shown in Fig. 4, whereby the lower edge 30 of the body 29 is received around the outer surface of the tail 7.

In the walls 10 of the tail 7 are the holes 35'. The walls have integrally formed therewith the bosses 36 in which are received the pins 37 on which is pivotally mounted the ribs 38 which extend forwardly of the airplane and normally are in parallel relation and in contact with the walls 10. The rear ends of the ribs have integrally formed therewith the fingers 39 which extend inwardly of the tail and at right angles to the ribs.

The cables 31 are received through the holes 40 and 41 respectively in the ribs 38 and the walls 10. The inner ends of the cables 31 are received through the holes 42 in the cable supports 43 fixed to the walls 10, and are received in the holes 44 in the windlass or guide 45 which is fixed to the shaft 46 having its ends 47 and 48 rotatably mounted in the bearings 49 and 50 suitably fixed to the inner surfaces of the sides 5 and 6 of the airplane. The ends of the cables, passed through the holes 44, may be knotted or by other suitable means fixed to the windlass. In the side 6 of the airplane 1 is the hole 51 through which projects the outer end 47 of the shaft 46, having the square hole 52 therein in which a suitable handle or socket wrench may be inserted to rotate the shaft for the purpose of winding the cables 31 on the windlass 45. The outwardly extending flanges 53 and 54, integrally formed with the ends of the windlass, retain the cables 31 upon the windlass.

Fixed to the side 6 of the airplane 1, adjacent the seat of the airplane operator, is the disc 55 having the inwardly extending lug 56 on which is pivotally mounted the rocker arm 57 comprising the manually operative hand contact handle 58 and the leg 59 to the outer end of which is fixed the forward end 60 of the cable 61 which extends rearwardly and has its rear end 62 fixed to the upper end 63 of the vertical arm 64, of the rocker arm 65, having the horizontal leg 66. Fixed to the side 6 of the airplane 1 is the support 67 having integrally formed therewith the inwardly extending lug 68 received in the hole 69 in the rocker arm 65, whereby the rocker arm is pivotally mounted. Suitably fixed to the upper end 63 of the vertical arm 64 of the rocker arm 65 is the forward end 70 of the cable 71 whose rear end is connected with the slidable bolt 72 slidably mounted in the support 73 which is fixed to the side of the tail 7 of the airplane 1 as by the screw 74.

The boss 75, integral with the tube 11, has secured thereto the coil spring 76 whose upper end is secured to the downwardly and forwardly extending arm 77 integral with the rear end of the bolt 72, whereby the bolt is normally urged in rearward position shown in Fig. 4. The rear lower end 78 of the bolt 72 is curved upwardly and has in contact therewith the front end 79 of the leg 80 of the rocker arm 81 pivotally mounted on the downwardly extending support 82 fixed to the top of the tail 7. The vertical leg 83, of the rocker arm, has its lower end in contact with the front end 84 of the collar 85 slidably mounted on the tube 11.

When it is desired to release the parachute 28 from the compartment 8 the operator of the airplane 1 manually forces the handle 58 downwardly whereby the leg 59 is caused to move forwardly thereby causing the vertical arm 64 of the rocker arm 65 to move forwardly whereby the cable 71 causes the bolt 72 to slide forwardly thereby permitting the horizontal leg 80 of the rocker arm 81 to slide upwardly over the curved surface of the end 78 of the bolt 72. The lower end of the vertical leg 83 of the rocker arm 81 is in contact with the front end 84 of the collar 85 having in its rear end 86 the recess 87 in which is received the coil spring 88 whose rear end contacts the support 89 suitably fixed to the rear end of the tube 11. The coil spring urges the collar 85 forwardly, whereby the outwardly extending circular flange 90, integrally formed with the rear end of the collar 85, contacts the vertical legs 39, of the ribs 38, which causes the vertical legs to move forwardly thereby causing the forward ends of the ribs 38 to move outwardly to the position shown in Figs. 16, 17, 18 and 19. Outward movement of the ribs 38 contacts the forward edge of the cover 91, which is formed from rubber, and forces the edges 92 from contact with the tail of the airplane. When the ribs are in the vertical position shown in Fig. 16, the currents of air enter the body 29 of the parachute 28 thereby causing the body to open to the position as shown in Fig. 16.

Simultaneously, when the operator forces the manual hand contact lever 58 downwardly and the cable 61 is caused to move forwardly, thereby forcing the vertical arm 64, of the rocker arm 65, forwardly the horizontal leg 66 is caused to move upwardly. The upper end of the connecting rod 93 is connected with the outer end of the horizontal leg 66 and therefore is caused to move upwardly whereby, since the lower end of the connecting rod 93 is connected with the forward end of the lever 94, pivotally mounted at the upper end of the vertical support 95, suitably fixed to the bottom of the airplane, the rear upturned end 96, of the lever 94, is caused to move downwardly and outwardly from the hole 97 in the flange 53 of the windlass 45, thereby permitting the air currents, caused by movement of the airplane, to unwind the cables 31 from the windlass.

When the operator of the airplane releases contact with the hand contact handle 58 the coil spring 98, having its upper end fixed to the front end of the horizontal lever 94 and its lower end fixed to the pin 99, fixed to the side 6 of the airplane, urges the front end of the lever 94 downwardly thereby causing the upwardly extending end 96, of the lever, to contact the outer surface of the flange 53 whereby, after the air currents and ribs 38 have forced the cables 31 rearwardly to the position shown in Fig. 16, and the windlass 45 has rotated one complete rotation the end 96 of the lever 94 contacts the lug 100, which extends outwardly from the flange 53, thereby preventing further outward movement of the cables 31.

Fixed to the side 6 of the airplane, as by the screws 101, is the support 102 having the track 103 therein in which is slidably mounted the timing arm 104 having integrally formed with its inner end the finger or lug 105 which is received in the spiral groove 106 formed between the spiral ribs 107 integrally formed with the outer surface 108 of the disc 109 which is fixed to the shaft 19, adjacent the end 18 of the cylinder 14.

Integrally formed with the lower side of the end 96 of the lever 94 is the boss 109' having the hole 110 therein in which is pivotally mounted the finger 111 and the L-shaped arm 112 whose leg 113 has screwed therein the bolt 114 whose upper end is adapted to be contacted by the lower end 115 of the arm 104. The nut 116, screwed onto the lower end of the bolt 114, is adapted to be tightened in contact with the lower surface of the leg 113 after the bolt is adjusted to accomplished the purposes hereinafter described.

When the parachute 28 is in the position shown in Fig. 16 the central upper portion of the parachute still is connected with the shaft 19. The air pressure created by the movement of the plane through the air is effective on the body 29 of the parachute 28 for forcing the central portion of the body outwardly thereby causing the shaft 19 to rotate which in turn rotates the disc 109 whereby the lug 105 travels in the spiral groove 106 and forces the arm 104 downwardly and forwardly whereby the rear end of the arm forces the L-shape arm 112 downwardly and the leg 113, of the lever, is caused to slide in contact with the lower surface of the pin 116, fixed to the side 6 of the airplane 1, whereby the rear end 96 of the lever 94 is caused to move downwardly and the upturned latch portion 117 is moved from contact with the outwardly extending lug 100. The bolt 114 is adjusted to such position so that when the holding ring 32 is released from engagement with the tongue 27 of the shaft 19 the latch 117 of the lever 94 releases engagement with the outwardly extending lug 100, thereby permitting the cables 31 to begin unwinding from the windlass 45 and the air pressure opens the parachute to the position shown in Figs. 17 and 18. Further movement of the cables 31 and the body 29 causes the parachute to open to the position shown in Fig. 19 and immediately thereafter the cables 31 are permitted to move farther outwardly, and the body 29 of the parachute 28 assumes the position shown in Fig. 20. The tube 11 and the ribs 38 cause the parachute to be discharged concentrically from the tail 7.

When the parachute is in the position shown in Fig. 16 the body 29 continues to open and the cables are stationary.

After the airplane has descended in contact with the ground, or the top of a building, or the like, and the operator of the airplane decided that it is desirable to release the parachute from contact with the airplane, in order to prevent the parachute from dragging the airplane and its occupants, suitable means may be provided whereby the parachute, and a portion of the mechanism, may be released from the airplane. As shown in Fig. 21, the container 118 is releasably connected with the rear end 119 of the airplane 120. The container 118 may contain the various mechanism, such as the tube 11, cylinder 14, shaft 19, windlass 45 and the like. In the illustration shown in Fig. 21 the rocker arm 121 is pivotally connected with the lower end of the boss 122, which is integrally formed with the top 123 of the airplane. The forward end of the container 118 has a flange thereon which fits into the upwardly extending flange 124, integral with the airplane. The forward upturned end 125 of the rocker arm 121 engages the notch portion 126 of the container. The coil spring 127, positioned intermediate the top of the airplane, and the rear end of the arm 121 urges the rear end of the arm downwardly, when the slidable pin 128, positioned between the top 123 and the forward end of the arm 121, may be manually removed therefrom whereby the upturned end 125 of the arm 121 is removed from the notch portion 126 and the parachute cables, being connected with the windlass 45, forces the container 118 from contact with the airplane. Various other means may be utilized to releasably connect the container 118 to the airplane, so that when desirable the parachute may be disconnected or released from contact with the airplane to prevent the airplane and its occupants from being dragged along the ground or from a building, or other location upon which the airplane alights, particularly when the force of air currents is sufficient to cause the parachute to drag the airplane.

In Fig. 23 is shown a compound parachute 130 of which the parachute 131 represents the parachute 28 fully described and shown in various figures, particularly Fig. 4. Connected with the outer edges 132 of the parachute 131 are the cables 133 having their upper ends connected with the outer edge of the inner or upper parachute 134 whereby, after the parachute 131 is fully opened, the inner parachute 134 is automatically opened by air pressure and still further decreases the speed at which the airplane and its occupants descend toward the ground. The cables 135 connect the outer edge of the parachute 131 with the airplane.

If desirable, a compound parachute 136, such as is shown in Fig. 24, may be supplied in which the lower edge 137 of the upper parachute 138 is positioned adjacent the top 139 of the lower parachute 140. When the parachute 140 has been extended or opened by air currents the upper parachute 138 automatically opens and is retained in contact with the lower parachute as by the cables 141 having their upper ends secured to the outer ends of the upper parachute 138 and to the edges of the lower parachute 140.

In Fig. 25 is shown a modification of the invention in combination with the hollow tail 142 of the airplane 143. The outwardly extending tubes 144 are hollow and have received therein the cables 145 whose inner ends are connected with the windlass 146 having the teeth 147 on its flange 148 in meshing engagement with the teeth 149 of the gear 150 rotatably mounted on the shaft 151 which is mounted on the support 152 having its upper end pivotally connected with the lower end of the support 153 being suitably fixed to the top 154 of the airplane.

In operation, the operator of the airplane pulls the cable 155 which is connected with the pivotally mounted lever 156. Movement of the lever 156 pulls the pin 157 forwardly, causing it to slide in the boss 158 or support 159, thereby removing the pin for the purpose of permitting the gear 150 to rotate one turn when the rear end of the finger 160 contacts the lug 161, and the parachute is partly removed from the receptacle 162, since forward movement of the cable 155 operates the lever 163 and causes the cord 164 to operate the lever 165 for the purpose of causing the latch 166 to be removed from the cover plate 167. The lug 168 of the timing arm 169 revolves in the spiral groove 170 and is caused to move upwardly whereby the lower end 171 of the arm forces the end 172 of the lever 173 upwardly thereby causing the end 174 of the lever to move downwardly which removes its contact with the latch 175 thereby permitting the coil spring 176 to force the support and gear 150 forwardly which removes the gear 150 from meshing engagement with the gear 146. Since the outer edge of the parachute is over the guides 177 the currents of air produced by movements of the airplane continue to pull the parachute from the receptacle 162 and unwinds the cables from the windlass thereby permitting the parachute to fully open. The gear 150 is rotated by a spring (not shown).

In Fig. 26 is shown a modification of the invention incorporated with the airplane 178. In the tail 179 of the airplane is the tube 180 having folded therein the parachute 181. The open rear end 182 of the tube permits the parachute edges to extend therefrom. When the mechanism is operated which causes the ribs 183 to extend outwardly thereby forcing the cables 184 from the windlass after the pilot of the airplane pulls the cable 185 forwardly which in turn pulls the latch end 186 of the rocker arm 187 forwardly and from contact with the windlass 188 around which the cables are wound thereby permitting the windlass to be rotated one revolution. The pin 189 slidably mounted in the vertical support 190, fixed to the bottom of the airplane, contacts the outwardly extending pin 191, in the windlass, thereby preventing the windlass from rotating more than one turn until the air currents have forced the parachute from the tube a predetermined distance when the cord 192, connected with the parachute, exerts force on the pin 189 and removes it from contact with the lug 191 thereby permitting the parachute to move farther outwardly and unwind the cables from the windlass until the parachute is fully open.

An advantage of the invention is that the parachute is adapted to open under all circumstances when the operator of the airplane operates the hand contact handle.

Another advantage of the invention is that, irrespective of the manner in which the parachute and cables are wound around the shaft and windlass, respectively, as soon as the operator of the airplane operates the hand contact lever the forward ends of the ribs 38 move outwardly and force the lower edge of the parachute outwardly in direct contact with the air. Therefore, the air pressure created by the movement of the airplane is effective for forcing the parachute from the compartment in the tail of the airplane and the cables are unwound from the windlass a predetermined distance when rotation of the windlass is automatically stopped and the cables remain stationary, while the parachute continues to be unwound from the shaft for a predetermined period of time until it is fully removed from the tail of the airplane and completely opened at which instant the cables are automatically permitted to be unwound from the windlass until the cables are fully extended.

Still another advantage of the invention is that when the parachute is inoperative it is positioned in the tail of the airplane in such a location that it does not at all interfere with the parts such as rudder, elevators, and other parts projecting above the fuselage of the airplane. The fact that the parachute is stored in the tail of the airplane results in impossibility of the parachute or the cables being tangled in projecting parts of the airplane when the parachute is being removed from the compartment in the tail, whereby the parachute is adapted to open instantly and with certainty.

Another advantage of the invention is that the parachute is adapted to open under all circumstances irrespective of weather conditions or the manner in which the parachute is wound around the shaft.

Still another advantage of the invention is that the ribs 38 are adapted to move the lower edge of the parachute outwardly with its outer edge spaced an equal distance from the outer edge of the tail of the airplane, whereby when air currents enter the parachute during its removal, it remains concentric of the tail.

Another advantage of the invention is that the various parts are adapted to operate positively since the various cables and levers are positioned so that other parts are unlikely to interfere with their operation.

Still another advantage of the invention is that the form and size of the compartment in which the invention is stored does not increase the wind resistance while the airplane is in operation. Moreover, the part of the airplane in which the invention is stored is not usually utilized for carrying passengers or baggage, and therefore no valuable space of the airplane is utilized. On the other hand, it is important to realize that the invention may be carried in compartments in various locations on the airplane, as well as in the tail, as shown in Fig. 2, which shows the plurality of the invention being incorporated with the wings of the airplane.

While I believe that the form of the invention illustrated in the drawings and referred to in the above description, as the preferred embodiment, is efficient and practicable, yet realizing that the conditions concurrent with the adoption of the device will necessarily vary, I desire to emphasize the fact that changes in the details may be resorted to, when required, without sacrificing any of the advantages of the invention as defined in the claims. Various changes may be made in the general form and arrangement of mechanical parts described without departing from the invention. Hence I do not limit myself to the precise details of the materials or the size and shape thereof as set forth, but consider myself at liberty to make such changes and alterations as fairly fall within the spirit and scope of the appended and final claims.

What I claim as new and desire to secure by Letters Patent is:

1. The combination with an airplane having walls forming a compartment in its tail, of a receptacle in said compartment and having its rear end integrally formed with the rear end of the walls of said compartment, said walls having holes therein, said receptacle comprising an integrally formed tube and cylinder, said receptacle being centrally disposed of said compartment, a shaft rotatably mounted in said cylinder and having a tongue thereon, a parachute comprising a cloth curved body having cables connected with its outer edge, a holding link fixed to the top of said body and adapted to receive said tongue whereby said body is releasably connected with said shaft, spaced apart ribs pivotally connected with said walls and adapted to contact the outer surface of said walls and having apertures therein registering with said holes, manually operative means to wind a portion of said body on said shaft, a portion of said body being received through said tube and around said ribs and said walls, said cables being received through said holes and said apertures, a windlass rotatably mounted in said compartment, the outer ends of said cables being fixed to said windlass, manually operative means to wind said cables around said windlass, means to pivot the front ends of said ribs outwardly, manually operative means to operate said last mentioned means whereby the outer edge of said body is forced outwardly by air pressure caused by movement of said airplane, thereby causing the outer edge of said body to be forced rearwardly and said body is unwound from said shaft and said link is removed from said shaft and said cables are unwound from said windlass, whereby said parachute is opened concentrically of said receptacle.

2. The combination with an airplane having walls forming a compartment in its tail, of a receptacle in said compartment and having its rear end integrally formed with the rear end of the walls of said compartment, said walls having holes therein, said receptacle being centrally disposed of said compartment, a shaft rotatably mounted and having a tongue thereon, a parachute comprising a cloth curved body having cables connected with its outer edge, a holding link fixed to the top of said body and adapted to receive said tongue whereby said body is releasably connected with said shaft, spaced apart ribs pivotally connected with said walls and adapted to contact the outer surface of said walls and having apertures therein registering with said holes, means to wind a portion of said body on said shaft, a portion of said body being received around said ribs and said walls, said cables being received through said holes and said apertures, a windlass rotatably mounted in said compartment, the outer ends of said cables being fixed to said windlass, means to wind said cables around said windlass, means to pivot the ends of said ribs outwardly, means to operate said last mentioned means whereby the outer edge of said body is forced outwardly by air pressure caused by movement of said airplane, thereby causing the outer edge of said body to be forced rearwardly and said body is unwound from said shaft and said link is removed from said shaft and said cables are unwound from said windlass, whereby said parachute is opened concentrically of said receptacle.

3. The combination with an airplane having walls forming a compartment in its tail, of a receptacle in said compartment, said walls having holes therein, said receptacle comprising an integrally formed tube and cylinder, a shaft rotatably mounted in said cylinder, a parachute comprising a cloth body having cables connected with its outer edge, spaced apart ribs pivotally connected with said walls and having apertures therein registering with said holes, manually operative means to wind a portion of said body on said shaft, a portion of said body being received through said tube and around said ribs and said walls, said cables being received through said holes and said apertures, a windlass rotatably mounted in said compartment, the outer ends of said cables being fixed to said windlass, manually operative means to wind said cables around said windlass, means to pivot the front ends of said ribs outwardly, manually operative means to operate said last mentioned means whereby the outer edge of said body is forced outwardly by air pressure caused by movement of said airplane, thereby causing the outer edge of said body to be forced rearwardly and said body is unwound from said shaft and said cables are unwound from said windlass, whereby said parachute is opened.

4. The combination with an airplane having walls forming a compartment in its tail, of a receptacle in said compartment and having its rear end integrally formed with the rear end of the walls of said compartment, said walls having holes therein, a rotatably mounted shaft, a parachute comprising a cloth curved body having cables connected with its outer edge, spaced apart ribs pivotally connected with said walls and having apertures therein registering with said holes, means to wind a portion of said body on said shaft, a portion of said body being received around said ribs and said walls, said cables being received through said holes and said apertures, a windlass rotatably mounted in said compartment, the outer ends of said cables being fixed to said windlass, means to wind said cables around said windlass, means to pivot the ends of said ribs outwardly, means to operate said last mentioned means whereby the outer edge of said body is forced outwardly by air pressure caused by movement of said airplane, thereby causing the outer edge of said body to be forced rearwardly and said body is unwound from said shaft and said cables are unwound from said windlass, whereby said parachute is opened.

5. The combination with an airplane having walls forming a compartment in its tail, of a receptacle in said compartment, said walls having holes therein, said receptacle comprising an integrally formed tube and cylinder, said receptacle being centrally disposed of said compartment, a shaft rotatably mounted in said cylinder and having a tongue thereon, a parachute comprising a cloth body having cables connected with its outer edge, a holding link fixed to the top of said body and adapted to receive said tongue whereby said body is releasably connected with said shaft, spaced apart ribs pivotally connected with said walls and adapted to contact the outer surface of said walls and having apertures therein registering with said holes, manually operative means to wind a portion of said body on said shaft, a portion of said body being received through said tube and around said ribs and said walls, said cables being received through said holes and said apertures, a windlass rotatably mounted in said compartment, the outer ends of said cables being fixed to said windlass, manually operative means to wind said cables around said windlass, means to pivot the front ends of said ribs outwardly, manually operative means to operate said last mentioned means whereby the outer edge of said body is forced outwardly by air pressure caused by movement of said airplane, thereby causing the outer edge of said body to be forced rearwardly and said body is unwound from said shaft and said link is removed from said shaft and said cables are unwound from said windlass, whereby said parachute is opened concentrically of said receptacle.

6. The combination with an airplane having walls forming a compartment in its tail, of a receptacle in said compartment and having its rear end integrally formed with the rear end of the walls of said compartment, said walls having holes therein, said receptacle comprising an integrally formed tube and cylinder, a shaft rotatably mounted in said cylinder, a parachute comprising a cloth curved body having cables connected with its outer edge, spaced apart ribs pivotally connected with said walls and having apertures therein registering with said holes, manually operative means to wind a portion of said body on said shaft, a portion of said body being received through said tube and around said ribs and said walls, said cables being received through said holes and said apertures, a windlass rotatably mounted in said compartment, the outer ends of said cables being fixed to said windlass, manually operative means to wind said cables around said windlass, means to pivot the front ends of said ribs outwardly, manually operative means to operate said last mentioned means whereby the outer edge of said body is forced outwardly by air pressure caused by movement of said airplane, thereby causing the outer edge of said body to be forced rearwardly and said body is unwound from said shaft and said cables are unwound from said windlass, whereby said parachute is opened.

7. The combination with an airplane having walls forming a compartment in its tail, of a receptacle in said compartment, said walls having holes therein, a rotatably mounted shaft, a parachute comprising a cloth body having cables connected with its outer edge, spaced apart ribs pivotally connected with said walls and having apertures therein registering with said holes, means to wind a portion of said body on said shaft, a portion of said body being received around said ribs and said walls, said cables being received through said holes and said apertures, a windlass rotatably mounted in said compartment, the outer ends of said cables being fixed to said windlass, means to wind said cables around said windlass, means to pivot the ends of said ribs outwardly, means to operate said last mentioned means whereby the outer edge of said body is forced outwardly by air pressure caused by movement of said airplane, thereby causing the outer edge of said body to be forced rearwardly and said body is unwound from said shaft and said cables are unwound from said windlass, whereby said parachute is opened.

8. The combination with an airplane having walls forming a compartment in its tail, of a receptacle in said compartment, said walls having holes therein, said receptacle comprising an integrally formed tube and cylinder, a shaft rotatably mounted in said cylinder, a parachute comprising a cloth body having cables connected with its outer edge, spaced apart ribs pivotally connected with said walls and having apertures therein registering with said holes, manually operative means to wind a portion of said body on said shaft, a portion of said body being received through said tube and around said ribs and said walls, said cables being received through said holes and said apertures, a windlass rotatably mounted in said compartment, the outer ends of said cables being fixed to said windlass, manually operative means to wind said cables around said windlass, means to pivot the front ends of said ribs outwardly, manually operative means to operate said last mentioned means whereby the outer edge of said body is forced outwardly by air pressure caused by movement of said airplane, thereby causing the outer edge of said body to be forced rearwardly and said body is unwound from said shaft and said cables are unwound from said windlass, whereby said parachute is opened, and means whereby when said parachute is partly discharged from said receptacle said cables are retained in stationary position and said body is gradually forced from said receptacle, and automatic means whereby when a predetermined portion of said body has been discharged from said receptacle said cables are permitted to unwind from said windlass to permit said parachute to fully open.

9. The combination with an airplane having a compartment in its tail, of a parachute stored in said compartment, a windlass in said compartment, cables connected with the outer edge of said parachute and adapted to be wound on said windlass, a rotatable shaft in said compartment, said parachute adapted to be wound on said shaft, manually operative means in said airplane, means adapted to be operated by said manually operative means to force a portion of said parachute from said compartment, whereby air pressure forces said parachute from said compartment, means to automatically retain said cables in partly unwound position until said parachute is fully unwound from said shaft, and means to automatically permit said cables to completely unwind from said windlass after said parachute is completely open.

10. The combination with an airplane having a compartment in its tail, of a parachute stored in said compartment, a windlass in said compartment, cables connected with the outer edge of said parachute and adapted to be wound on said windlass, a rotatable shaft in said compartment, said parachute adapted to be wound on said shaft, manually operative means in said airplane, means adapted to be operated by said manually operative means to force a portion of said parachute from said compartment, whereby air pressure forces said parachute from said compartment, means to automatically retain said cables in partly unwound position until said parachute is fully unwound from said shaft.

11. The combination with an airplane having walls forming a compartment in its tail, of a receptacle in said compartment, a cover on said walls, said walls having holes therein, a rotatably mounted shaft, a parachute comprising a cloth body having cables connected with its outer edge, spaced apart ribs pivotally connected with said walls and positioned between said walls and said cover, and having apertures therein registering with said holes, means to wind a portion of said body on said shaft, a portion of said body being received around said ribs and said walls, said cables being received through said holes and said apertures, a windlass rotatably mounted in said compartment, the outer ends of said cables being fixed to said windlass, means to wind said cables around said windlass, means to pivot the ends of said ribs outwardly whereby said cover is automatically removed from said walls, means to operate said last mentioned means whereby the outer edge of said body is forced outwardly by air pressure caused by movement of said airplane, thereby causing the outer edge of said body to be forced rearwardly and said body is unwound from said shaft and said cables are unwound from said windlass, whereby said parachute is opened.

12. In an airplane, a tubular tail therefor, a parachute packed in said tail with its normally open end extended from the rear open end of said tubular tail and disposed about the end of the tubular tail, pivoted spreader arms mounted on said tail beneath said parachute end, latch mechanism for securing said arms flat against said tubular tail, a reel for the cords of said parachute controlled by said latch mechanism, said latch permitting the spreader arms to swing and open the ends of the parachute, and a connection detachably securing the tip of the parachute to plane.

13. In an airplane, a tubular tail therefor, a parachute packed in said tail having its normally open end edge extended outwardly beyond the tubular tail, release mechanism in said tubular tail disposing said normally open end edge of the parachute in position for movement against the air, whereby the pressure of the air draws the parachute from the tail, a parachute pack control, and manually operated means for said release mechanism for permitting limited withdrawal of the parachute attaching cords and full axial withdrawal of the parachute.

14. In an airplane, a tubular tail therefor, a parachute packed in said tail and adapted to be withdrawn from the rear open end thereof, said parachute including support cords, a reel for said cords, the open end portion of said parachute disposed beyond the end of the tubular tail, a latch device securing said open end portion of said parachute in position whereby the air pressure encountered as the airplane moves through the air is ineffective for displacing said parachute, and a control mechanism extended to the cab of the plane, said mechanism having operative connection to the reel and to the latch mechanism for permitting the air currents to act on the extended end of the parachute and for permitting limited withdrawal of the attachment cords as the parachute is drawn from the tail into position of service.

VICTOR F. ZAHODIAKIN.